May 26, 1931. E. A. SPERRY 1,806,652
AUTOMATIC ACCELERATOR
Filed July 25, 1925  4 Sheets-Sheet 2

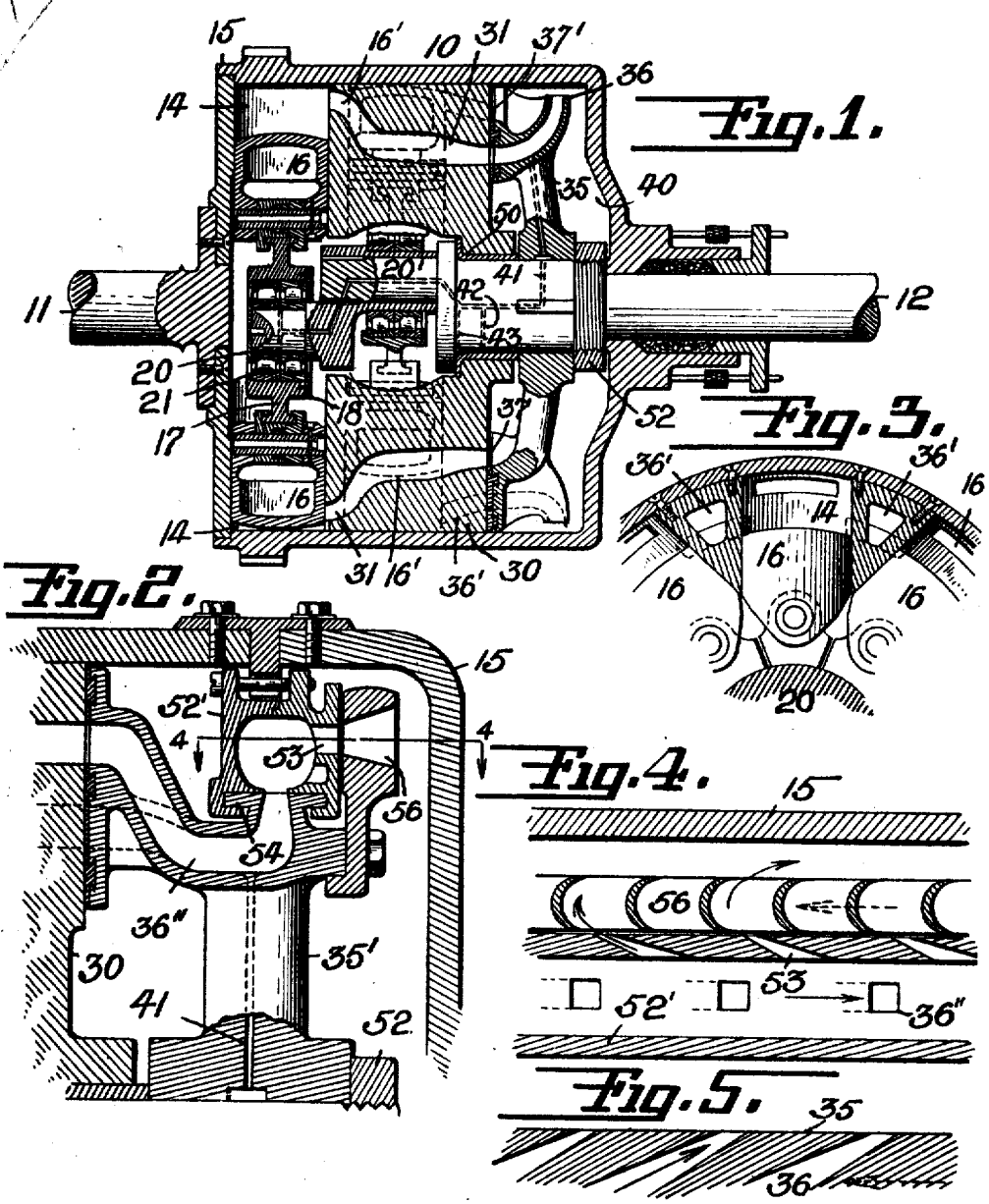

Inventor
Elmer A. Sperry.

May 26, 1931.　　　E. A. SPERRY　　　1,806,652
AUTOMATIC ACCELERATOR
Filed July 25, 1925　　　4 Sheets-Sheet 3
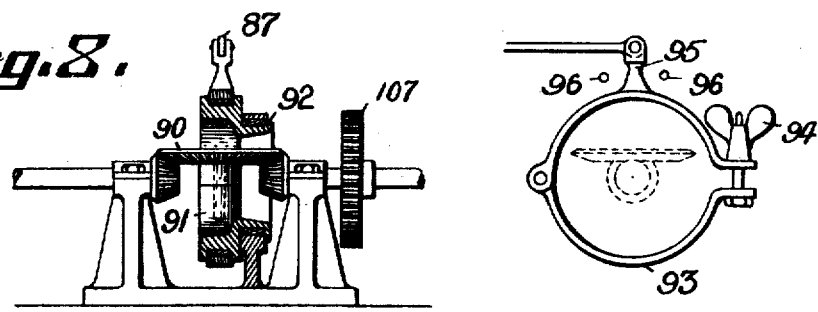
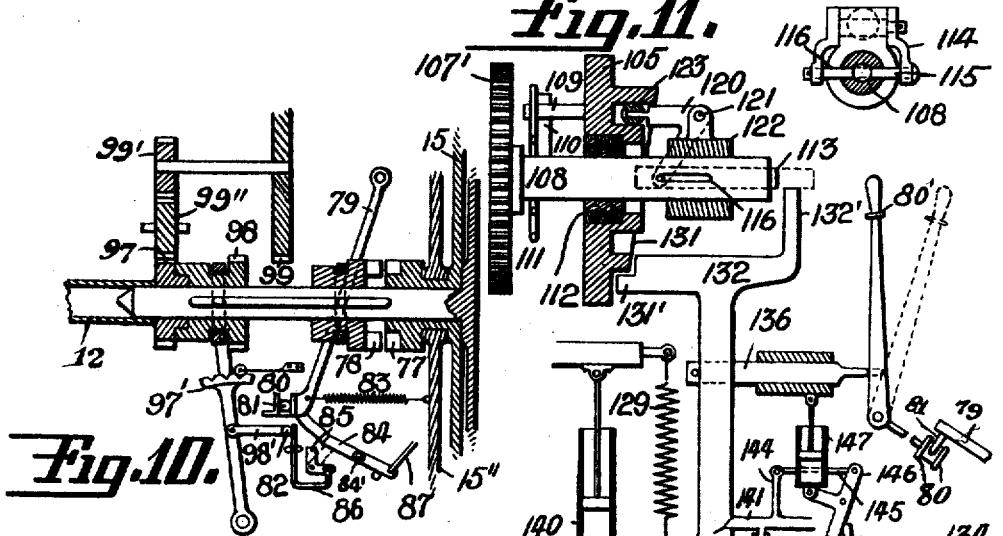
Inventor
Elmer A. Sperry May 26, 1931.  E. A. SPERRY  1,806,652
AUTOMATIC ACCELERATOR
Filed July 25, 1925   4 Sheets-Sheet 4

Inventor
Elmer A. Sperry.

Patented May 26, 1931

1,806,652

UNITED STATES PATENT OFFICE

ELMER A. SPERRY, OF BROOKLYN, NEW YORK, ASSIGNOR TO SPERRY DEVELOPMENT COMPANY OF DOVER, DELAWARE, A CORPORATION OF DELAWARE

AUTOMATIC ACCELERATOR

Application filed July 25, 1925. Serial No. 45,996.

This invention relates to automatic accelerators, of a type having wide application, and which are particularly desirable for automotive vehicles. More specifically my invention consists in a torque multiplier which depends upon the generation and utilization of hydraulic pressure. This may be accomplished in several ways, first, by causing the drag of the driving element on the driven element to operate a hydraulic pressure-generating device, and secondly, in providing means whereby the hydraulic pressures thus created are utilized through a fluid turbine or similar mechanism to impart positive torques to the driven element.

It is a further object of my invention to provide an automatic accelerator of the type hereinbefore specified which consists of relatively few parts, is simple in structure, noiseless in operation, and which utilizes a small amount of hydraulic medium, preferably oil, which is effective only during the acceleration period.

It is a further object of my invention to utilize the pressures created by the hereinbefore-mentioned mechanism for the purpose of providing a force-feed lubricant for the bearings of said mechanism.

Other objects and advantages of this invention will become apparent in the following detailed description thereof.

In the accompanying drawings

Fig. 1 is a vertical section through one form of automatic accelerator embodying my invention.

Fig. 2 is a vertical section of a portion of a modified form of automatic accelerator.

Fig. 3 is a vertical section showing an enlarged detail of the pump mechanism.

Fig. 4 is a section taken substantially on the line 4—4 of Fig. 2.

Fig. 5 is a diagrammatic representation of the turbine element shown in Fig. 1.

Fig. 8 is a front view, partly sectioned vertically, of a form of differential control mechanism.

Fig. 9 is a side view taken approximately centrally to the Fig. 8 device.

Fig. 10 is a detailed view, partly sectioned vertically and partly diagrammatic, of means for rendering the accelerator effective or ineffective.

Fig. 11 is a vertical section through a detail of a mechanism for automatically controlling the accelerator.

Fig. 12 is an end elevation of a detail of the driving connection in the Fig. 11 device.

Fig. 13 is an end view of a detail of the Fig. 11 device.

Fig. 14 is an end elevation of the cam plate shown in the Fig. 11 device.

Figure 6:
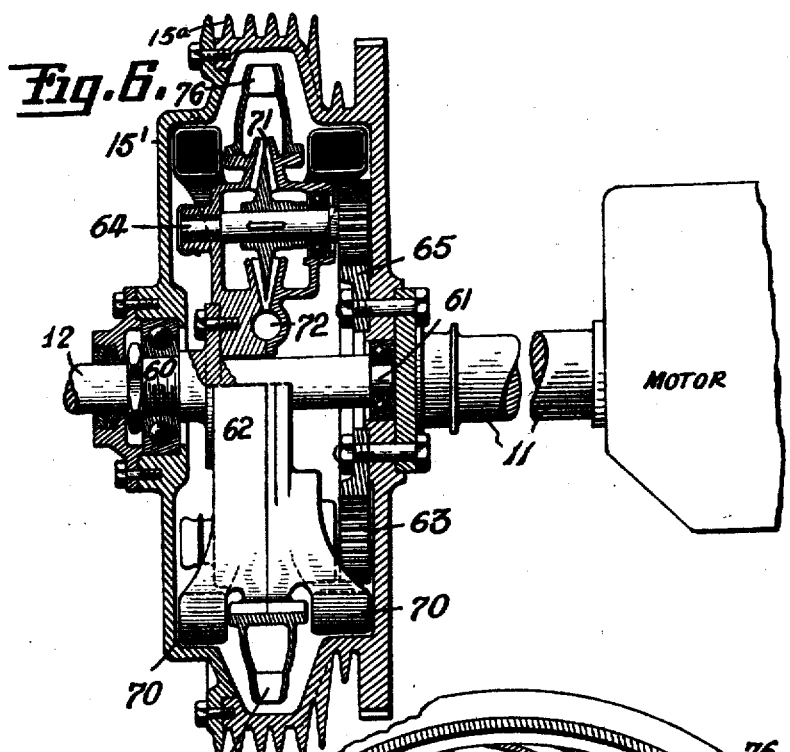
Fig. 6 is a view partly sectioned vertically, and with parts broken away, of still another form of my invention.

Referring to Fig. 1 of the drawings, there is disclosed one form of automatic accelerator 10 embodying my invention shown interposed between a driving shaft 11 and a driven shaft 12. The differential speeds between shafts 11 and 12 are utilized in my novel accelerator for the purpose of operating a pump which creates hydraulic pressures for a purpose hereinafter specified. Preferably I operate the said pump by utilizing the drag of the driving elements on the driven elements. The said pump may comprise a plurality of cylinders 14 formed in a casing 15 fixed to the driving shaft 11 and within said cylinders operate pistons 16 attached to a series of bearing blocks 17 which are interconnected by a means such as a flange 18 to operate as a unit about an eccentric block or shaft 20. A ball bearing 21 may be interposed between the bearing blocks and the eccentric 20. The said eccentric is formed on the driven shaft 12.

It will be apparent that as the driving shaft 11 rotates housing 15, the cylinders 14 and pistons 16 around eccentric 20, each piston in succession will, for substantially half of a revolution, be operated in pumping direction into its cylinder and for substantially the other half of a revolution be operated out of the piston in suction direction. Moreover, the pistons at opposite sides will be one half cycle removed, that is, while the pistons at one side are on the pressure stroke, the pistons on the other side will be on the suction stroke. Movable with the housing 15 and in fixed relation to the cylinders 14 is a port member 30 having a plurality of ports 31, each of said ports 31 communicating with a respective cylinder 14, so that for substantially half a revolution each piston 16 will be discharging fluid under pressure through its respective port 31, and for the other half of its revolution will be sucking fluid into the cylinder through said port.

For utilizing the hydraulic pressure generated on the pressure strokes of the pistons, I mount upon the shaft 12 a valve or turbine member 35 comprising a plurality of jets 36 and ports 37 so positioned with respect to eccentric 20 that said jets 36 cooperate with those ports 31 of the pistons which are on their pressure strokes. Thus, it will be seen in Fig. 1, the upper piston 16 is about to begin its pressure stroke and hence its port 31 registers with a turbine jet 36. The lower piston 16 has completed its pressure stroke and is about to begin its suction stroke and hence its port 31 registers with a port 37. Thus, throughout substantially half a revolution, while there is a difference in speed between shaft 11 and shaft 12, fluid will be discharged under pressure through jets 36 to cause the turbine member 35 to tend to rotate. The jets are, of course, positioned in such direction that the reaction will be in a direction to assist the rotation of shaft 12 and thus add the hydraulic reaction to the drag which shaft 11 exerts upon shaft 12 through the pump drive. Under these circumstances the fluid will be discharged from the jets in a direction opposite to the direction of rotation of casing 15 and the hydraulic medium therein, and the reaction between the fluid issuing from the jets and the hydraulic medium in housing 15 will yield another source of useful torque transmitted to shaft 12 in the proper direction. From the above description it will be apparent that the eccentric positioning of the pump would result in mechanical unbalance. To obviate this objection, I provide shaft 12 with a second eccentric 20' disposed 180° out of phase with eccentric 20 and operating a similar set of pistons 16' in a similar manner. The jets 36' and the ports 37' cooperating with the said pistons 16' will, of course, likewise be disposed 180° out of phase with the jets 36 and ports 37. In this manner the device will be mechanically balanced at all times.

The fluid employed within the casing 15 will be of such quantity that when, due to the rotation of the casing 15, it is driven toward the periphery of said casing by centrifugal force, it will cover the ports 37—37'. The jets will thus discharge while submerged in the hydraulic medium. The hydraulic reaction may be employed for the purpose of lubricating the bearings in said accelerator. For this purpose channels 41 may lead from the jets 36—36' through the shaft 12 and its eccentrics 20—20' and thence by branch channels 42, 43, etc. to lubricate all of the bearings, including the thrust bearing 50 between shaft 12 and the pump. Said thrust bearing may be utilized as an additional source of useful torque to be transmitted to shaft 12 and the degree of said torque may be varied by bringing the rubbing surfaces nearer together or moving them further apart by means of an adjustable nut 52 threaded on shaft 12 and abutting against turbine 35.

It will be apparent that the rate of operation of the pumps depends upon the relative speeds of shafts 11 and 12 until the point where, should the speed of shaft 12 equal that of shaft 11, there will be no movement of pistons 16—16' relative to the eccentrics 20—20' and hence there will be no hydraulic reaction, because at this point none is necessary.

Referring now to Fig. 2, I have shown a modified form of my invention wherein I employ, instead of the single jet reaction, a double jet reaction. For this purpose I provide jet members 36" which may correspond to original jet members 36 and 36' of Fig. 1, which discharge into an annular member 52' carried by frame 15. The said member 52' is again provided with a plurality of jets 53 so that on discharging therethrough a second set of reactions is obtained. Said member 52' may be journaled at 54 upon the turbine member 35'. In addition, the fluid ejected through jets 53 may be employed to drive a turbine wheel 56 mounted upon said turbine member 35'. In this manner three distinct sources of hydraulic torque are obtained for the purpose of assisting the drag of shaft 11 upon shaft 12.

Figure 7:
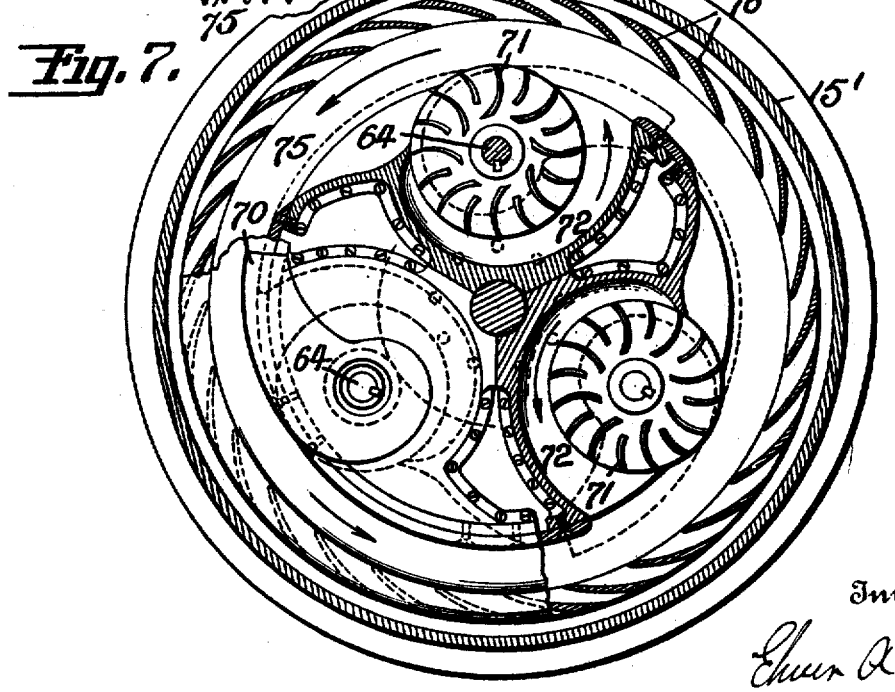
Fig. 7 is a front elevation, partly sectioned vertically and with parts broken away, of the form of invention disclosed in Fig. 6.
Figure 15:
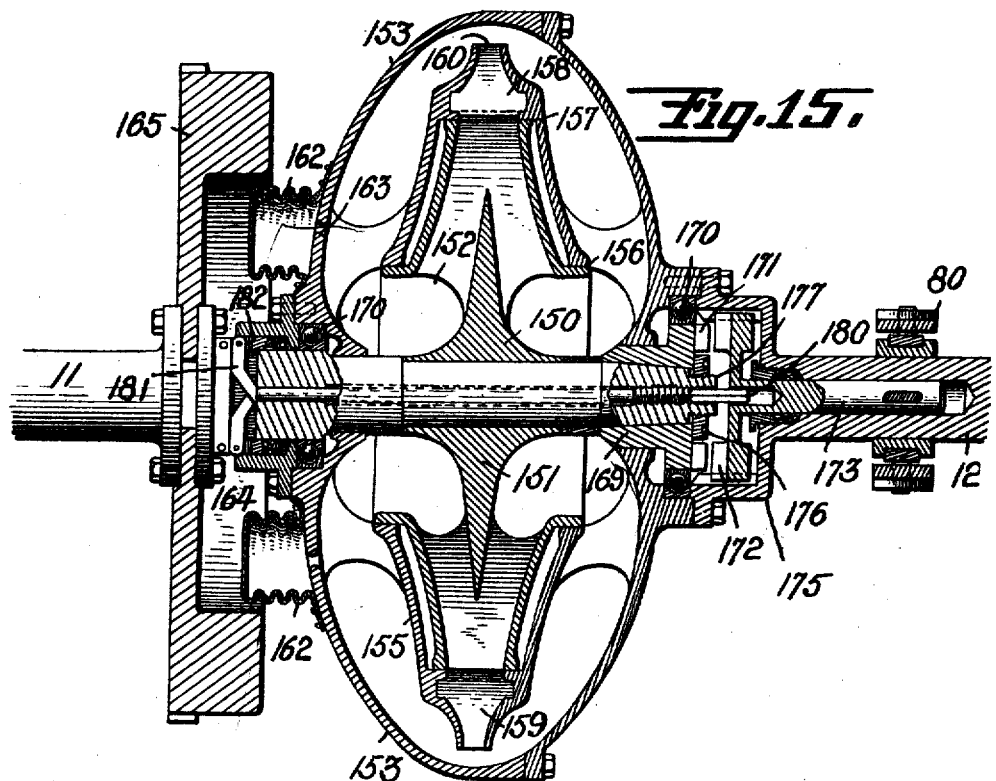
Fig. 15 is a vertical section through another form of automatic accelerator.

Referring to Figs. 6 and 7, there is illustrated still another modification embodying the principles of my invention. In this modification I employ the differential speeds of the driving shaft 11 and driven shaft 12 for the purpose of operating one or more centrifugal generators for the purpose of building up a hydraulic pressure which then acts upon a turbine wheel in such manner as to assist the rotation of shaft 12. In this form the device is enclosed in a casing 15' which may be carried by the shaft 11, said casing being journaled upon bearings 60 on the shaft 12. The shaft 12 is in turn journaled upon bearings 61 in said casing. Fixed upon shaft 12 within said casing 15' is a casing 62, within which are mounted the turbine generators. The connection between shaft 11 and shaft 12 is effected by means of gears 63 fixed at one end of each turbine generator shaft 64 and meshing with a gear 65 fixed to shaft 11. It will now be apparent that when there is differential speed between shaft 11 and shaft 12, shafts 64 will be rotated by the rotation of gears 63 to operate the turbine generators. This will cause fluid to be drawn in through inlet passages 70 and expelled by the centrifugal force of the generator fans 71 into outlet passages 72. The fluid discharged under pressure through the various passages 72 unites in a common passage 75 and is thence driven through turbine member 76 comprising a plurality of jet passages which are so positioned that the reaction of the fluid issuing therethrough is in the proper direction to assist the rotation of shaft 12. Casing 15' rotates to cause centrifuging of the liquid, thus giving a first pressure stage before the fluid enters the pumps for a second pressure stage. The rotation of casing 15' serves also to separate out the air in the fluid before said fluid is taken into the pumps.

It will be understood that as the speed of shaft 12 approaches the speed of shaft 11, the rate of travel of turbine shafts 64 about their axes decreases to cause consequent decrease in speed of operation of the turbine generators until the point where, should the speed of shaft 12 equal the speed of shaft 11, the gears 63 will be stationary relative to gear 65 and no hydraulic reaction will take place. Casing 15' may have cooling ribs 15a.

Figure 17:
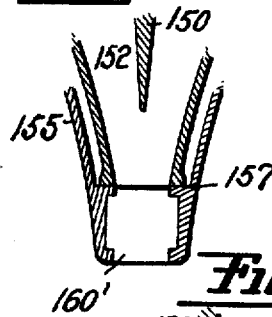
Fig. 17 is a vertical section through one form of nozzle and bucket arrangement.
Figure 18:
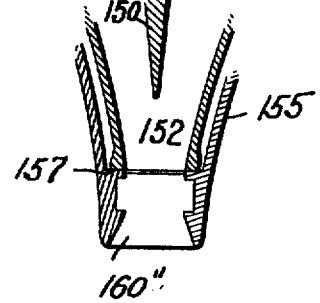
Fig. 18 is a view similar to Fig. 17; but showing another form of bucket.
Figure 16:
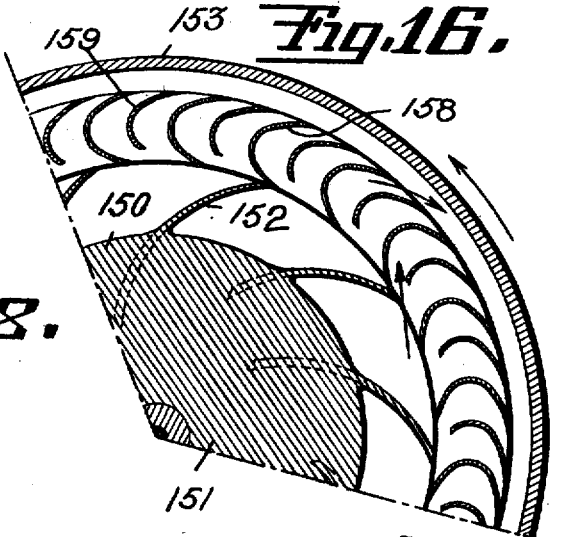
Fig. 16 is a section taken substantially through the casing in Fig. 15.

In Figs. 15 to 18 inclusive I have illustrated still another form of hydraulic type automatic accelerator. In this form I employ but a single turbine wheel 150 mounted upon an extension of the driving shaft 11 and which may comprise a central hub member 151 to which a plurality of blades 152 are fixed or formed integral therewith. The said turbine member extends into a housing 153 connected to the driven shaft 12, said housing being filled with the operating fluid. Fixed to said housing is a turbine member 155 which may ride upon shoulders 156—157 formed on the turbine member 150 so as to be adequately supported thereby. The said turbine member 155 is formed at its upper end as an annular member cooperating with the blades forming the ends of turbine member 150 so that the fluid thrown off by said blades tangentially, when shaft 11 rotates, is discharged at relatively great tangential velocity into the annular portion of said turbine member 155. Said annular portion may be subdivided by partitions or buckets 158—159 into a plurality of jets or orifices 160. The fluid will, therefore, discharge through orifices 160 and the reaction will transmit torque to the driven shaft 12. The jets 160 may be so formed by partitions 158—159 as to provide constricted outer ends so that the fluid discharges at relatively high velocity compared to the entering velocity, thus transmitting correspondingly large torques to the driven member. Other forms 160', 160'' which said orifices may assume are shown in Figs. 17 and 18. In order that the torque, due to the jet reactions, may be delivered to said driven shaft 12 in the proper direction to assist said shaft in overcoming the initial inertia the buckets formed in the upper end of turbine member 155 are so shaped as to reverse the flow of the fluid entering said buckets, so that the fluid will be discharged in a direction substantially opposite to that in which it entered the said buckets. The force of impact of the fluid thrown off by the turbine wheel entering the buckets will also obviously be transmitted to the driven shaft in the proper direction. If desired, casing 153 may be provided with cooling ribs similar to ribs 15a in Fig. 6.

Since the housing 153 is filled with operating fluid, I provide means for taking up the expansion of said fluid which may occur during the operation of the device. For this purpose I may provide a plurality of sylphon members 162 connected to the casing 153 and communicating with the interior thereof by means of openings 163, said sylphon tubes being preferably so positioned on the casing as to lie within the cavitated portion 164 of the usual engine flywheel 165.

In this case, as in the previous forms, the casing 153 is supported upon the driving member by means of ball-bearings 170. The casing is closed at both ends, the closure at one end comprising a bushing 169 fixed upon the extension of shaft 11 and carrying one portion 171 of the clutch member, the other portion 172 being carried by a slidable member 173 operated by a fork 80, as described hereinafter. When the clutch members are in engagement there is a straight-through drive between shafts 11 and 12, and no hydraulic reactions will be set up within casing 153 which will rotate together with shaft 11. Said bushing 169 may be held in place by a nut 176 threaded upon the reduced end 177 of the extension of shaft 11. The said clutch members may be contained in a housing 175 bolted to the corresponding end of the casing so that when said casing 175 is removed, access may be had to the end of the shaft extension. I may form the said shaft extension with a hollow bore through which may extend a stem 180 which is accessible when casing 175 is removed so that said stem may be screwed inwardly or outwardly to operate by means of a linkage 181 a packing gland 182 at the other end of casing 153.

The mechanism disclosed in Figs. 8 to 14 inclusive has to do with an application of the automatic accelerators hereinbefore described to an automobile vehicle. That is to say, this mechanism disclosed in said Figs. 8 to 14 enables the automatic accelerator to be automatically thrown out when there is no further necessity therefor, and automatically thrown in whenever the necessity therefor arises. Referring to Fig 10, there is shown a housing, which may be, e. g., the housing 15 of Fig. 1, supported in a bearing which may be provided in the usual flywheel bell housing 15'' connected with the engine base. Outboard of this are clutch teeth 77 cooperating with a sliding sleeve bearing corresponding clutch teeth 78, the latter being slidably mounted to rotate with shaft 12 so that when these clutches are engaged, casing 15 and shaft 12 rotate together and all action, hydraulic and other, interior to the casing, ceases and this clutch constitutes a straight-through connection from the engine to the rear axle. The clutch 78 may be controlled by a lever 79 operated by a fork 80 on the lower end of the usual change gear lever and controlled entirely by hand through a handle 80', or clutch 78 may function to re-engage automatically as follows: The fork cooperates with two pins 81 and 82, the former mounted on the manipulating lever 79 against a retractile spring 83 which operates to close the clutch 78 upon the release of a detent 84. When the fork 80 is shifted over laterally for operation of the reverse gear and cooperating with pin 82, then the little bell-crank springpressed locking lever 85 is swung in behind and locks detent 84 from operation through the endwise displacement downwardly (on the drawings) of the bent rod 86 through its engagement with the fork 80. The operation of the detent 84 about its pivot 84' is rather unique by being mechanically actuated by a bar 87 leading to a differential (see Figs. 8 and 9), the action being similar to the electric action of the differential shown in my earlier joint patent application with H. C. Drake, now Patent No. 1,688,691, granted October 23, 1928, and my Patent No. 1,600,651, granted September 21, 1926, in this way securing the automatic throw-in of the straight-through connection and substituting it for the hydraulic accelerator as soon as the major function of the latter, namely, acceleration of the vehicle, has been fulfilled. The differential acts at any predetermined point, preferably the point of substantial equality in speeds between casing 15 and shaft 12, whereupon the clutch goes in by itself noiselessly. This can be selected at any point in the actual speeds simply by letting up on the pedal of the engine. The great value of the automatic acceleration factor of the hydraulic accelerator is that it gives automatically the complete acceleration fulfilling much more than all of the torque and speed functions of the step-by-step gear with a perfectly smooth and uninterrupted curve by simply stepping on the speed-controlling pedal practically without the shifting of gears other than reversing. The further automatic handling of this shifting mechanism will be discussed later.

Referring to Fig. 8, the shafts operating the differential are considered to be from the engine at the right and from the running gear or radius shaft at the left. The two bevel pinions working on the planetary gear 90 turn the planetary frame 91 in the direction according to which pinion is operating more rapidly, the planetary frame being journaled centrally with the two shafts at 92 and carrying a drag strap (see Fig. 9) indicated at 93. This is shown adjustable by thumb nut 94 and has an upwardly protruding arm 95 which operates between the two retaining stops 96. The pinions normally rotate in opposite directions. In starting up, the engine shaft is driving much more rapidly than the auto-running gear or driven shaft which is practically stationary, and, therefore, the planetary frame 91 will be rotated in such direction as to carry projection 95 and bar or link 87 as to cause said link 87 to render detent 84 effective to prevent engagement between teeth 77 and 78. After projection 95 engages the respective stop 96, further movement of the planetary frame 91 will not cause further movement of link 87 because of the slip friction connection between the planetary frame 91 and said friction band 93. When, however, the driven shaft picks up speed and approximates the speed of the engine shaft, then, as described above, by letting up on the pedal of the engine, the speed of the driven shaft momentarily exceeds the speed of the engine shaft. This causes the planetary frame 91 to be driven in the opposite direction, carries projection 95 into engagement with the other stop 96, and moves link 87 in a direction to cause detent 84 to disengage lever 79 and permits spring 83 to lock clutch 78 in gear teeth 77. The straight-through driving connection is thus automatically effected when there is no longer any necessity for the automatic accelerator.

It is obvious that when the car is reversed, it should be handled through the accelerator, and, therefore, clutch 78 should be held from engagement with teeth 77 even though the differential might operate link 87 to withdraw detent 84. So this detent is locked by part 85 swinging under it whenever the handle 80 is shifted over for operating the reverse gear. This operation involves the usual disconnecting of the straight-through connection between shaft 12 and casing 15 through clutch 77, 78, and when the clutch is clear, engaging the teeth of gears 98 and 99 of the usual reverse train 98, 99, 99', 99'', 97 through manipulation of lever 97' and link 98', bearing the pin 82.

There has been described above a mechanism disclosed in Figs. 8, 9 and 10 whereby the automatic accelerator may be cut out by hand or automatically whenever there is no longer any necessity therefor, and the straight-through driving connection from the driving shaft to the driven shaft is desired. I provide means also for automatically restoring the automatic accelerator whenever the necessity therefor arises. This construction is illustrated in Figs. 11 to 14, and may be briefly described as follows:

The shaft extending from the differential to the engine bears gearwheel 107, which meshes with gearwheel 107' shown in Fig. 11. The latter gearwheel 107' has a resilient connection with a cam wheel 105. This connection may comprise a pin 109 carried by cam wheel 105 and connected to a post 110 fixed to shaft 108, said connection comprising a spiral spring 111. Cam-wheel 105 has a ball bearing mounting 112 on the said shaft 108. By this construction, it will be seen that cam-wheel 105 will tend to lag behind gear 107' during acceleration of the latter and to an extent proportional to the said acceleration.

I utilize the above described lag between cam-wheel 105 and shaft 108 for operating a central post or pin 113 slidably mounted within the shaft 108 and adapted to be operated axially thereof by some suitable means such as a fork 114 engaging opposite ends of a pin 115 extending through the post 113 and slidable in slots 116 in said shaft. Said fork 114 may form one arm of a bell crank 120 pivotally mounted at 121 upon a sleeve 122 fixed to shaft 108. The other end of bell crank 120 may include a bearing member 123 adapted to operate in a cam slot 125 (see Fig. 14) formed in the face of cam-wheel 105. By this arrangement, it will be readily appreciated that depending upon the extent of lag of cam-wheel 105 with respect to gear 107', the member 123 will be carried around in a spiral cam slot 125 a greater or lesser extent, and thus toward the axis of shaft 108. In so moving toward said axis, bell crank 120 will be rocked about pivot 121 to cause post 113 to be protruded beyond the end of shaft 108 and into the path of a link 132.

In addition to the spiral cam slot 125 formed in the face of cam-wheel 105, the said face is formed into a spiral cam 131 with which is adapted to engage a shoulder or projection 131' formed on the link 132.

The usual throttle pedal of the car is indicated at 134 pivoted at 134' and is furnished with the usual connection 134'' to the throttle. As more and more power is needed, the pedal is depressed to an increasing extent, raising a projection 135 forming part of said pedal and allowing a spring 129 to retract the projection 135' of link 132 so as to follow, except at times when projection 132' encounters the protruding post 113, whereupon the projection 135 leaves the link 132 and its projection 135' behind. However, if post 113 is withdrawn as it is in the drawing, then bar 132 would continue farther until projection 131' engages the spiral cam 131 and the whole link 132 is swung to the right, sliding its guiding pin 136 also to the right, which engages handle 80', throwing the same vigorously to the right until the detent 84 returns and holds the same in readiness for the next cycle. One of the objects of the mechanism of Figs. 11 to 14 is to render the accelerator effective at any time when the engine does not respond to floor pedal, whether it be its power condition as to compression or otherwise or even if it should be out of fuel, because when the pedal is down the engine should run at an accelerated speed, whereupon the post 113 would always be out in front of bar 132. But should it fail to respond from overload or otherwise then the amount of lag between gear 107 and cam wheel 105 would decrease and member 123 would move outwardly from the axis of shaft 108 to cause bell crank 120 to be operated to draw post 113 inwardly thus affording an opportunity for a powerful return of lever 80 and thus automatically bringing into play the accelerator in giving the engine a leverage over the load as though the car were run in low gear.

In order to prevent too rapid rising of link 132 when the foot pedal 134 is depressed and before post 113 has had an opportunity to be protruded when the engine accelerates, there may be provided a dash-pot 140 to delay the upward movement of said link for a period of say 1 to 2½ seconds for a full stroke.

From the above description, it is apparent that while the engine is accelerating in response to pressure upon the foot pedal, post 113 will prevent link 132 from rising. When, however, the engine has attained a certain speed and the rate of acceleration decreases, post 113 will be withdrawn. Since, however, the engine has attained the requisite speed, it is not desired that link 132 be permitted to rise and thus throw in the automatic accelerator as hereinbefore described. For this purpose, I provide a positive locking pawl or dog 141 normally spring-pressed into engagement with the link by a spring 142 and adapted to engage in a groove 143 in said link, said groove being so positioned as to cooperate with the dog when said link 132 is in engagement with post 113. If dog 141 were always in engagement with link 132 then it would always engage in groove 143 and prevent upward movement of link 132 even when the engine failed to accelerate in response to pressure upon foot pedal 134, and post 113 was not protruded. To obviate this condition, I provide means for normally holding dog 141 out of engagement with link 132 and for delaying the engagement of the dog with said link when the foot pedal is depressed. For this purpose dog 141 may have fixed thereto a post 144 movable through link 145 and bell crank 146 by the foot pedal 134 in engagement with one arm of said bell crank. The linkage, it will be seen, is such that when pedal 134 is depressed to accelerate the engine, dog 141 is permitted to move toward engagement with link 132. This movement, however, is delayed by delayed-action means such as the dash-pot 147. Said delayed-action means is so timed as to permit engagement of dog 141 with the link after said link has engaged post 113. So that in case link 132 does not engage post 113, due to failure of the engine to accelerate, groove 143 will have moved past dog 141 before the latter can engage said link and in this manner the dog will not interfere with the rising of link 132 under these circumstances to throw in the automatic accelerator. By releasing pedal 134 and then depressing the same again, dog 141 will be withdrawn and the cycle may be repeated, i. e., the automatic accelerator being free to be rendered effective if the engine fails to respond.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an accelerator for automotive vehicles, in combination, a driving member, a driven member, means whereby said driving member transmits torques directly to said driven member, means for utilizing the action of said driving member on said driven member to generate hydraulic pressures, valve mechanism for said pressure-producing means, there being rubbing surfaces between said mechanism and said pressure-producing means, and means whereby the torques generated by said rubbing surfaces are transmitted to said driven member in the same direction as, and in addition to, the torques transmitted directly thereto by said driving member.

2. In an accelerator for automotive vehicles, in combination, a driving member, a driven member, means whereby said driving member transmits torques directly to said driven member, means for utilizing the action of said driving member on said driven member to generate hydraulic pressures, valve mechanism for said pressure-producing means, there being rubbing surfaces between said mechanism and said pressure-producing means, hydraulic pressure tending to separate the rubbing surfaces, a thrust bearing for opposing said separation, and adjustable means for said thrust bearing whereby the degree of rubbing of said surfaces may be controlled.

3. In an accelerator for automotive vehicles, in combination, a driving member, a driven member, means whereby said driving member transmits torques directly to said driven member, means for utilizing the action of said driving member on said driven member to generate hydraulic pressures, valve mechanism for said pressure-producing means, there being rubbing surfaces between said mechanism and said pressure-producing means, hydraulic pressure tending to separate the rubbing surfaces, a thrust bearing for opposing said separation, and means for utilizing the hydraulic pressures for creating forced-feed lubrication of said thrust bearing.

4. In combination, a vehicle having a driving element, a driven element, a straight-through connection between said elements, a connection including an accelerator between said elements, means for shifting from the straight-through connection to the accelerator connection, and means for automatically actuating said shifting means when the driving element is overloaded, said last-named means including an actuating member, means for operating said member, and means responsive to the speed of the driving element normally maintaining said member out of engagement with said operating means but permitting said engagement when the speed of the driving element falls a predetermined degree.

5. In combination, a vehicle having a driving element, a driven element, a straight-through connection between said elements, a connection including an accelerator between said elements, means normally tending to maintain the straight-through connection effective, means for rendering said first means ineffective and said accelerator effective, means for rendering said second means ineffective when the speed of the driven element is measurably equal to the speed of the driving element, and means for rendering said last-named means inoperative when the vehicle is operated in reverse.

6. In combination, a vehicle having a driving element, a driven element, a straight-through connection between said elements, a connection including an accelerator between said elements, means for automatically shifting from the accelerator connection to the straight-through connection when the speed of the driven element is measurably equal to the speed of the driving element, and means for rendering said first means ineffective when the vehicle is operated in reverse.

7. In combination, a vehicle having a driving element, a driven element, a straight-through connection between said elements, a connection including an accelerator between said elements, means normally tending to maintain the straight-through connection effective, means for rendering said first means ineffective and said accelerator effective, means including a differential controlled by said driven and driving elements for rendering said second means ineffective when the speed of the driven element is measurably equal to the speed of the driving element, and means for rendering said last-named means inoperative when the vehicle is operated in reverse.

8. In combination with an automotive engine, a driving element operated thereby, a housing mounted on said element, fluid within the housing, a freely moving driven element entering said housing, means whereby pressures are created in the fluid mass by revolving the housing, means within said housing and connected to said driven element for utilizing the fluid under pressure, including means for drawing a supply of said fluid from a point submerged below the annular liquid surface, and means operated by the drag of the driven element behind the driving element for operating said last named means.

9. In combination a vehicle having a driving element, a driven element, a straight-through connection between said elements, a connection including an accelerator between said elements, means for rendering said second connection effective when said vehicle is accelerating, means for rendering said second connection ineffective and said first connection effective when the speed of the driven element is measurably equal to the speed of the driving element and means for preventing rendering said second connection effective when the acceleration of the vehicle drops off without corresponding drop in speed.

10. In combination, a vehicle having a driving element, a driven element, a straight-through connection between said elements capable of being disconnected, a connection including an accelerator between said elements, means for rendering said second connection effective when said vehicle is accelerating including a cam operated in response to acceleration of said driving element, a member movable into engagement with said cam and connected to said second connection, means actuated in response to lag of said driven element with respect to said driving element into the path of said member for preventing engagement thereof with said cam when the speed of said driven element is measurably equal to the speed of said driving element, and means for retarding the movement of said member with respect to said means actuated in response to said lag.

11. In combination, a vehicle having a driving element, a driven element, a straight-through connection between said elements capable of being disconnected, a connection including an accelerator between said elements, means for rendering said second connection effective when said vehicle is accelerating including a cam operated in response to acceleration of said driving element, a member movable into engagement with said cam and connected to said second connection, means actuated in response to lag of the driven element with respect to the driving element into the path of said member for preventing engagement thereof with said cam when the speed of the driven element is measureably equal to the speed of the driving element, means for retarding the movement of said member with respect to said means actuated in response to lag, and locking means adapted to move into engagement with said member, said member having means adapted to cooperate with said locking means to receive the same when said member is maintained out of engagement with said cam.

12. In combination, a vehicle having a driving element, a driven element, a straight-through connection between said elements capable of being disconnected, a connection including an accelerator between said elements, means for rendering said second connection effective when said vehicle is accelerating including a cam operated in response to acceleration of said driving element, a member movable into engagement with said cam and connected to said second connection, means actuated in response to lag of said driven element with respect to said driving element into the path of said member for preventing engagement thereof with said cam when the speed of said driven element is measurably equal to the speed of said driving element, locking means adapted to move into engagement with said member, said member having means adapted to cooperate with said locking means to receive the same when said member is maintained out of engagement with said cam, and means for retarding the movement of said locking means into engagement with said member.

In testimony whereof I have affixed my signature.

ELMER A. SPERRY.